United States Patent [19]

Bernard

[11] Patent Number: 4,855,916

[45] Date of Patent: Aug. 8, 1989

[54] ANTI-SKID BRAKING SYSTEM CONTROL METHOD

[75] Inventor: Douglas E. Bernard, Hawthorne, Calif.

[73] Assignee: Hughes Aircraft Company, Los Angeles, Calif.

[21] Appl. No.: 138,540

[22] Filed: Dec. 28, 1987

[51] Int. Cl.$^4$ ................................................ B60T 8/32
[52] U.S. Cl. .................................. 364/426.02; 303/97; 303/99; 180/197
[58] Field of Search ...................... 364/426.02; 303/97, 303/99, 100; 180/197

[56] References Cited

U.S. PATENT DOCUMENTS 4,554,990  11/1985  Kamiya et al. .................. 303/97
4,701,855  10/1987  Fennel ............................ 303/97
4,788,644  11/1988  Inagaki .......................... 303/100

Primary Examiner—Gary Chin
Attorney, Agent, or Firm—Steven M. Mitchell; Mark J. Meltzer; A. W. Karambelas

[57] ABSTRACT

An anti-skid braking system control method determines the brake torque on a wheel of a road vehicle to prevent wheel lock-up while retaining braking force. The method utilizes a wheel slip-wheel acceleration phase plane (400), which is divided into at least three and preferably four wedge-shaped sectors (401, 402, 403, 404) meeting at a central point (440), each sector representing one of three available brake control actions (A, H, R) to be taken. The vehicle's wheel slip and wheel acceleration are estimated, a representation of the phase plane is used to determine in which sector the slip/acceleration coordinate lies, and a control command is output to the system for effecting the desired control action in accordance with the sector determined. The control method is adaptive to vehicle speed.

18 Claims, 5 Drawing Sheets

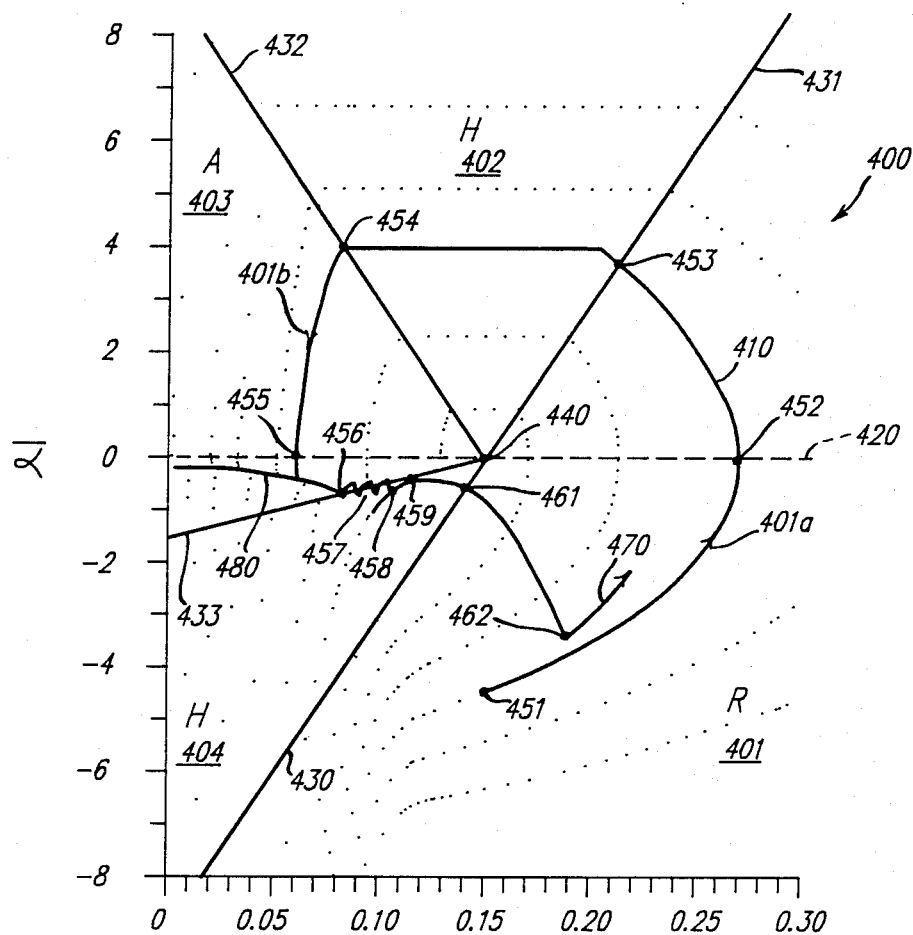
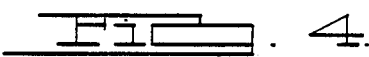

ANTI-SKID BRAKING SYSTEM CONTROL METHOD

BACKGROUND OF THE INVENTION

The invention generally relates to automated anti-skid braking systems. More specifically, the invention concerns control methods for determining which of a number of available brake commands will be issued at a given point in time during an anti-skid braking sequence.

Automatically controlled anti-skid braking systems (ABS) traditionally have sought to attain three goals. The first goal of an ABS is to avoid front wheel lock-up. Under such a condition, one loses "steerability." The second goal of a typical ABS is to avoid "fish-tailing" or rear-end stability. The third goal of an ABS is to minimize the stopping distance. It has been found that the stopping distance of a vehicle may be made shorter if the wheels are operated at low slip rather than in a fully locked or skid condition (the effective coefficient of friction is greater at lower slip than at full slip).

The typical ABS attempts to optimize stopping distance, steerability and rear-end stability during so-called "panic stops". In a typical ABS method, one desires a high brake torque "apply" rate for quick response. Additionally, one needs a high "release" rate, if the condition of lock-up is sensed as about to begin. The conditions of "apply", "hold" and "release" refer respectively to increasing, constant and decreasing brake pressure or resulting brake torque. The apply state means brake torque is being increased, the release state means that brake torque is being decreased, while the hold state indicates that the brake torque is being maintained constant.

In most control systems there is a desire for large rates of change when the controlled state is far from its desired value and for small rates of change when the controlled state is close to its desired value. Also, it is undesirable to have large swings between the apply and release states, due to limitation of typical hydraulic braking systems. Hence, any chosen ABS control law should not go back and forth at high rates between the apply and release states, else a requirement for larger hydraulic components will arise.

One known solution for producing smaller rates of change which avoid such large swings between apply and release is to use the so-called "step-up" and "step-down" approach. The step-up and step-down approach basically interposes a hold state between any apply and release sequence. For example, under a step-up, one would enter an apply state, then enter a hold state perhaps longer than the apply state before entering another apply state, and alternating thereafter. Functionally, such an approach mimics a slow apply condition. Conversely, in a step-down, one would have a release state followed by a hold state and so on to provide a type of "slow release".

In the prior art, most logic required to implement the control law for an ABS is used in formulating step-up and step-down sequences, which may involve many special cases which need special timers and control paths along with storage or saving of previous control states and a history of their occurrence over time. Additionally in the prior art, the phase plane of wheel slip versus angular acceleration of the wheel utilized a great number of control areas in the plane, each of which called for one of several different actions on the part of the braking system.

Therefore, there is a need for an anti-skid braking method using a control law which will result in a savings of the logic required for its implementation.

SUMMARY OF THE INVENTION

Accordingly, it is an object of the invention to eliminate the need for step-up and step-down routines in a control method for determining required commands in an anti-skid braking system.

It is a further object of the invention to eliminate the need for use of phase planes with a large number of control cells.

The method for determining a desired one of a plurality of available brake control actions involves the steps of partitioning a phase plane having coordinates defined by wheel slip and wheel acceleration into a predetermined number of sectors, each meeting at a common point in the plane and each sector representing one of the desired brake control actions. Wheel slip and acceleration are estimated, and the phase plane is examined at a coordinate point defined by the slip and acceleration estimates. From the phase plane examination, one can determine the sector containing the point and may then issue a command designating one of the desired brake control actions in accordance with the determined sector.

It is a feature of the invention that the control method limits wheel lock-up to maintain steerability and lateral stability of the vehicle during panic stops.

It is a further feature of the invention that only three control commands are required, without the need for step-up and step-down command sequences.

BRIEF DESCRIPTION OF THE DRAWING

These and other objects and features of the invention will become apparent from a reading of a detailed description taken in conjunction with the drawing in which:

FIG. 4 depicts a limit cycle in a phase plane utilizing a four-sector control method;

FIG. 6 is a flow chart of the sector control method designed in accordance with the principles of the invention.

DETAILED DESCRIPTION

Phased Plane Analysis

The phase plane is a natural and classical tool for studying the behavior of low order nonlinear systems. It is particularly useful when studying "bang-bang" control systems which use lines in the phase plane as switching boundaries.

This section of the description will introduce the phase plane concept, form simplified equations of motion for a one-wheel system, and show how a phase plane may be used to graphically depict the open loop system response and the effect of control switching boundaries. In conjunction with system requirements and with equations of motion, the phase plane may be used to develop control methods following the principles of the invention. One of the most important criteria for an ABS control method is its robustness to parameter variations. Large variations are expected in several parameters including vehicle speed, road surface, brake fluid viscosity, and drive train effective inertia. Any ABS controller method must be able to give acceptable performance as these and other parameters are varied.

Consider a nonlinear second order system:

$$\frac{d^2x}{dt^2} + g\left(x, \frac{dx}{dt}\right) = 0 \quad (1)$$

Define y:

$$y = \frac{dx}{dt} \quad (2)$$

giving a coupled nonlinear set of first order differential equations:

$$\frac{dy}{dt} + g(x, y) = 0 \quad (3)$$

$$\frac{dx}{dt} - y = 0$$

The traditional phase plane is a plot of x vs. y as a function of time. Initial conditions on x and y completely define the path or trajectory that the curve of y vs. x will take.

The entire initial condition problem may be solved by plotting the path resulting from a sufficiently large number of different initial conditions. No two paths may cross, although two or more paths may converge and neighboring paths may diverge. From any initial condition there is a unique path that the solution of the above set of differential equations will follow; if paths could cross, there would be two different paths from the crossing point.

Figure 1:
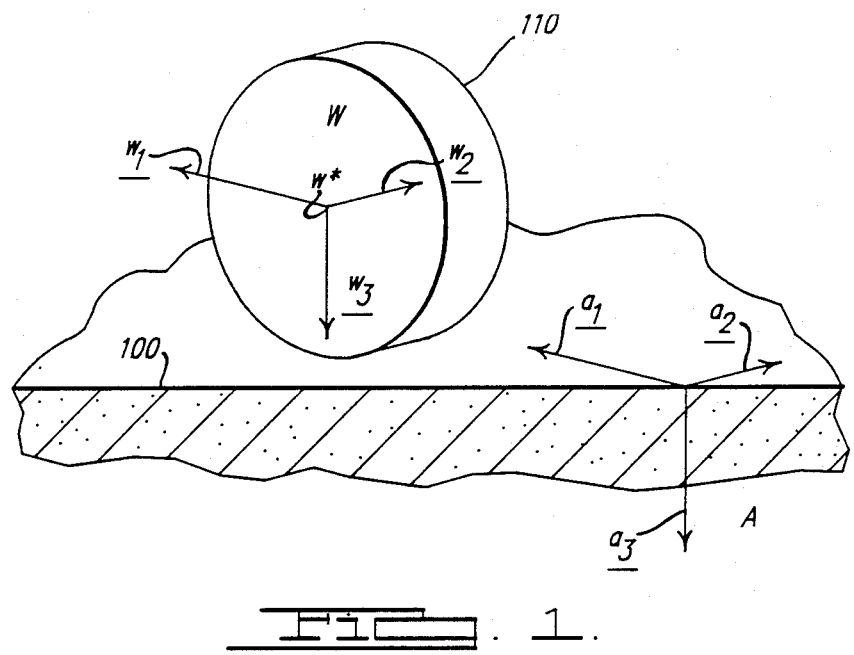
FIG. 1 is a perspective view of a vehicle wheel depicting coordinate systems which will be used in explaining the invention, one coordinate system associated and moving with the wheel and a second coordinate system attached to the surface upon which the wheel rotates.

To apply phase plane analysis to an anti-skid braking system, consider a very simplified model of a wheel rolling on the ground. With reference to FIG. 1, let A be a coordinate system fixed in the ground with $\underline{a}_3$ directed downward, and let W be a coordinate system fixed in the wheel. Assume that the wheel is constrained to rotate about an axis $\underline{w}_2$ through W*, the wheel center of mass. Consider the special case of planar motion of the wheel in a vertical plane such that $\underline{w}_2$ is perpendicular to $\underline{a}_3$. Choose $\underline{a}_2 = \underline{w}_2$, $\underline{a}_1 = \underline{a}_2 \times \underline{a}_3$—i.e. $\underline{a}_1$ is defined by the vector cross product of $\underline{a}_2$ and $\underline{a}_3$.

The above definitions are in agreement with the SAE standard coordinate systems in which the z or '3' axis is nominally downward, the x of '1' axis is nominally forward, and the y of '2' axis is out of the right. Unfortunately for forward motion of the vehicle, the wheel angular velocity about $\underline{w}_2$ is typically negative as defined. To simplify the following analysis $\omega$ will be defined so that it is positive in normal driving:

$$\omega = -{}^A\underline{\omega}^W \cdot \underline{w}_2 \quad (4)$$

where ${}^A\underline{\omega}^W$ is the angular velocity of W with respect to A

The equation of motion for the wheel motion about $-\underline{w}_2$ is:

$$I \frac{d\omega}{dt} = -T + T_r \quad (5)$$

where:
I = spin inertia of the wheel (inertia about $\underline{w}_2$)
t = time
T = torque exerted by car on wheel about $\underline{w}_2$ (typically positive for braking)
$T_r$ = moment about $-\underline{w}_2$ of all forces exerted by the road on the tire ("road torque", typically positive for braking.) Modeled as:

$$T_r = \mu_{eff} N h \quad (6)$$

where:
h = height of wheel center above ground (taken positive)
N = normal force between tire and road (taken positive)
$\mu_{eff}$ = effective coefficient of friction between rolling and slipping tire and road. Modeled as a simple function of longitudinal slip, s. The slip, s, is defined as follows:

$$s = 1 - \frac{\omega R}{v} \quad (7)$$

where:
R = effective rolling radius of the wheel (typically R h, but R > h)
pe,uns/v/ = ${}^A\underline{V}^{W^*} \cdot \underline{a}_1$ where ${}^A\underline{V}^{W^*}$ is the velocity of W* in A.

Eq. (5) defines the motion of a wheel. Using it as the basis of phase plane analysis requires a number of simplifying assumptions. A simple model for the brake torque is a linear function of time which depends on the ABS control mode.

$$T = T_0 + Qt \quad (8)$$

where Q is the apply or release rate of change of brake torque, and $$Q = \begin{cases} Q_A > 0 \text{ for Apply mode} \\ Q_H = 0 \text{ for Hold mode} \\ Q_R < 0 \text{ for Release mode} \end{cases} \quad (9)$$

An additional "Step Up" mode exists which is a sequence of Applys and Holds. This is approximated below as a slow Apply.

Although the torque is a decidedly nonlinear function of time, a linear approximation may be adequate for ABS operation, given the short period of time that the system is in any one mode.

Considering Eq. (5) and the subsequent definitions, assume that I, N, h, and Q are constants and the $\mu_{eff}$ is a constant function of slip--which may be a function of time. Substituting Eq. (8) into Eq. (5) and differentiating with respect to time removes the time dependence and allows a nondimensional formulation which exposes which combinations of parameters are important.

$$I\frac{d^2\omega}{dt^2} = -Q + (Nh)\left[\frac{d\mu_{eff}}{ds}\right]\frac{ds}{dt} \quad (10)$$

The slip, s, is a function of both $\omega$ and v. For simplicity, and recognizing that the vehicle speed tends to change much more slowly than the wheel speed, it is assumed that v is constant. This simplifies the computation of the time rate of change of s and avoids the introduction of an additional variable, v, into Eq. (10).

$$\frac{ds}{dt} \approx -\frac{(R)}{v}\frac{d\omega}{dt} \quad (11)$$

giving:

$$I\frac{d^2\omega}{dt^2} + Q + \left(\frac{NRh}{v}\right)\left(\frac{d\mu_{eff}}{ds}\right)\frac{d\omega}{dt} = 0 \quad (12)$$

After some algebra:

$$\bar{I}\frac{d\bar{\alpha}}{d\bar{t}} + \bar{Q} + \frac{d\mu_{eff}}{ds}\bar{\alpha} = 0 \quad (13)$$

$$\frac{ds}{d\bar{t}} + \bar{\alpha} = 0$$

where:
$\bar{\omega} = \omega R/v = 1-s$
$\alpha = d/dt$
$\bar{\alpha} = \alpha R/g = d\omega/dt =$ wheel acceleration in g's
$\bar{t} = tg/v =$ time in units of the time required to stop at one g.
g = acceleration of gravity
$\bar{I} = Ig/NhR \approx Ig/NR^2$
$\bar{Q} = Qv/Nhg \approx Qv/NRg$ Eq. (13) can be put in the form of Eq. (3) if $\bar{\alpha}$ is identified with y and $-s$ is identified with x. In a slight variation from tradition, plots of $\bar{\alpha}$ vs. s will be described as the phase plane.

The path in the phase plane will depend on the non dimensional parameters $\bar{I}$, $\bar{Q}$, and $d\mu_{eff}/ds$.

$\bar{I}$ depends on the effective moment of inertia of the wheel--including the drive train, the rolling radius and wheel center height, and the instantaneous normal force. The effective moment of inertia can vary by as much as an order of magnitude, and the normal force will vary by a large fraction of its nominal value in severe maneuvers and due to loading variations.

$\bar{Q}$ depends on the vehicle velocity and the rate of change of brake torque as well as the wheel center height and the normal force. The vehicle velocity variation over which a typical ABS should operate covers about two orders of magnitude form 1-3 mph at the low end to 120-180 mph at the high end. The rate of change of brake torque will vary due to ±30% variations in specific torque and variations in hydraulic fluid flow rates through orifices. The flow rates depend on both the temperature and the pressure difference across the orifice.

Since $\mu_{eff}$ is an explicit function of slip, $d\mu_{eff}/ds$ is an explicit function of slip. It is also a function of the road surface and the slip angle. Road surface variations can change the slope of the $\mu$-slip curve at low slip by an order of magnitude and change the location of the maximum coefficient of friction. As the slip angle increases from zero, the longitudinal friction coefficient, $\mu_{eff}$ decreases at increasing values of slip. The decrease is greater at low slip than at high slip, resulting in a shift of the maximum coefficient of friction to higher values of slip, s.

Plots of the effective longitudinal friction coefficient, $\mu_{eff}$ vs. longitudinal slip, s are called "$\mu$-slip curves." Typical $\mu$-slip curves are characterized by a maximum at some relatively low—5% to 30%—value of slip, dropping to zero at zero slip and decreasing gradually from the peak at higher values of slip. For passenger cars, the peak varies from about 1.0 on dry surfaces to 0.1 on ice. Some references describe wet ice values as low as 0.02. A typical $\mu$-slip curve used in phase plane analysis is shown in FIG. 2.

Figure 2:
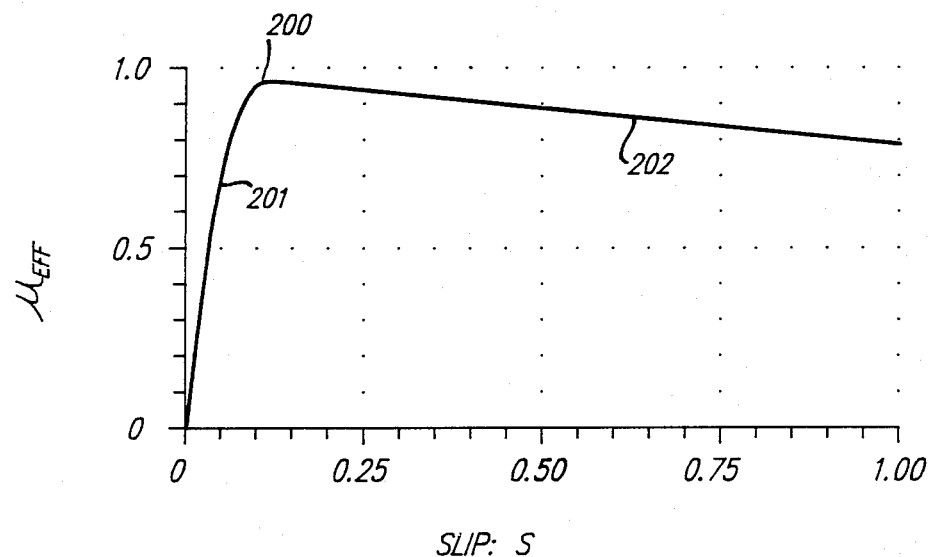
FIG. 2 is a graphical representation of a typical relationship between wheel slip and the effective longitudinal coefficient of friction of a rotating wheel on a surface.

The features to note with reference to the $\mu$-slip curve of FIG. 2 are that at low slip, the effective coefficient of friction is zero, while at high slip, the coefficient of friction is relatively high. The coefficient of friction shows a peak 200 at an intermediate value of slip. To the left of peak 200 is the stable region 201, while to the right of peak 200 is the unstable region 202. The lateral coefficient of friction is highest at zero slip and monotonically decreases as slip increases. The optimal ABS attempts to operate in a region of slip where both lateral and longitudinal forces are relatively high.

Figure 3:
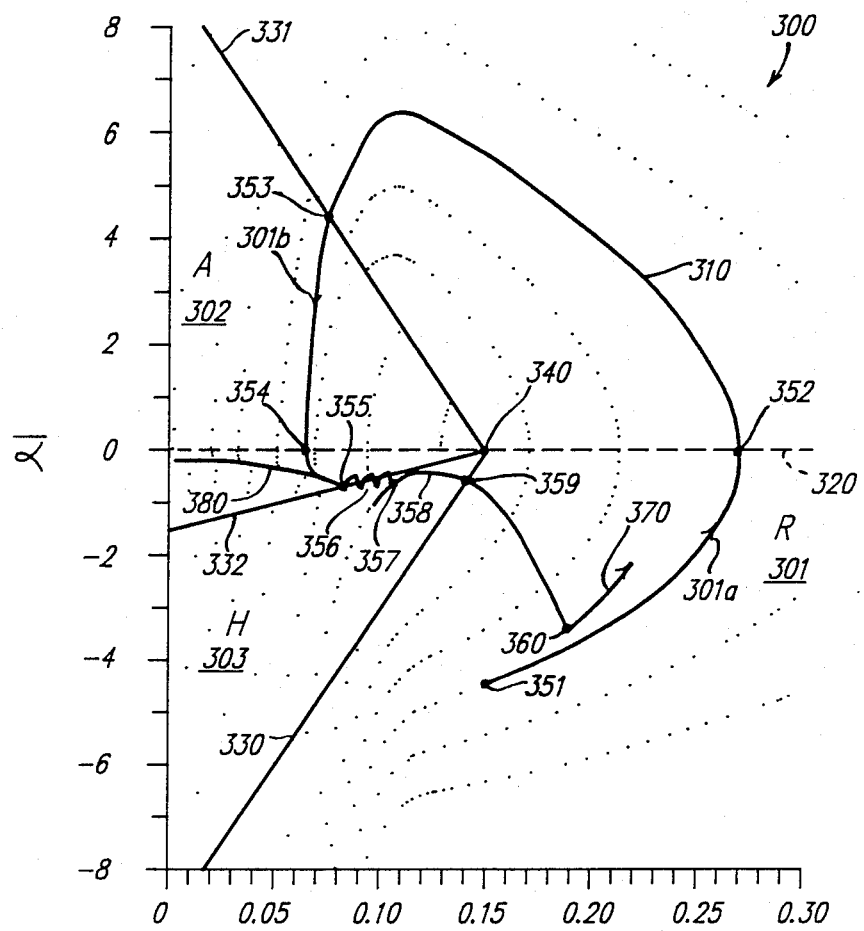
FIG. 3 depicts a typical limit cycle path in a phase plane for a three-sector control method.

With reference to FIG. 3, the paths the system will follow in the phase plane selected are shown as dotted lines. These paths are proportional to the $\mu$-slip curve for the vehicle in question and are displaced in the acceleration coordinate due to brake torque.

The three-sector control method utilizes the phase plane depicted in FIG. 3. As seen from FIG. 3, the phase plane is defined by coordinates of slip and wheel angular acceleration $\bar{\alpha}$, and the plane is divided into three pie or wedge shaped sectors; Apply or A sector 302, Hold or H sector 303 and Release or R sector 301. Zero angular acceleration is depicted along dashed line 320, while the sectors are divided by linear boundaries—the boundary between the Release and Apply regions being designated 331, the boundary between the Apply and Hold regions being designated 332 and the boundary between the Hold and Release sectors designated as 330.

The three-sector control method works as follows. Starting in the Apply region A, a stable region of the $\mu$-slip curve focuses most elements of the set of possible paths (shown as dotted lines) to a line 380 and then to a point 355 at the Apply/Hold switching line 332. The slopes of the paths in the A and H regions are such that the control method will switch back and forth between Apply and Hold sectors while moving along the switching curve. This feature or inherent characteristic of this phase plane combines a pure Apply region followed by switching between the Apply and Hold sectors and automatically provides the prior art function of step-up mode without the necessity for providing specific implementing logic.

The phase plane will be traversed along a typical path in a counter-clockwise direction, and once the path begins to nearly repeat itself, a path sweeping through 360° is termed a "limit cycle". It is desirable to maintain the limit cycle relatively large and non-collapsing toward the center point 340 at which all three sectors meet, since this enables better slip, velocity, and acceleration state estimates while using the phase plane control approach.

A typical limit cycle shown as path 310 in FIG. 3 begins in the Release or R region at point 351, crosses between regions of negative and positive angular acceleration at point 352 and continues to boundary line 331 with the Apply or A region at point 353. The direction traversed along the path is shown by arrows 301a and 301b. The path continues and crosses back into a region of negative acceleration at point 354 whereupon it is caused by stable region 201 (FIG. 2) to converge to point 355 located at boundary 332 between the Apply and Hold regions. At this point the path will continue toward the right through region 356 where it takes the form of an arcuate saw-tooth for switching back and forth between the Hold and Apply regions until the path intersects a curve tangent to line 332 at point 357 whereupon it will follow that curve along the region of 358 to point 359 along boundary 330 between the Release and Hold regions. Overshoot will then bring the path down to point 360 whereupon a new limit cycle will begin along path 370 which will generally parallel the path just described. This process continues until the vehicle comes to a speed below which it is safe to lock up the wheel (typically on the order of three miles per hour).

It should be noted that the paths in the phase plane such as that shown in FIG. 3 are very much function of vehicle speed, this means that a design that works well at one speed will not necessarily have the required performance at other speeds. It has been found that optimal results occur when the slopes of the sector boundary lines vary with vehicle speed. In particular, choosing the slopes proportional to vehicle speed is both simple and effective. A minimum slope is needed at lower speeds to limit the effect of acceleration noise.

The desire to have the slopes of the switching lines adaptive with vehicle speed can be shown by starting from Eq. 13 reproduced below.

$$I\frac{d\bar{\alpha}}{dt} + Q + \frac{d\mu_{eff}}{ds}\bar{\alpha} = 0 \quad (14)$$

$$\frac{ds}{dt} + \bar{\alpha} = 0$$

Eliminating time:

$$I\frac{d\bar{\alpha}}{ds} - \frac{Q}{\bar{\alpha}} - \frac{d_{eff}}{ds} = 0 \quad (15)$$

For slip above about 20%, the variation of $\mu_{eff}$ with slip, s, is small and equation 15 may be rewritten as:

$$\frac{d\bar{\alpha}}{ds} = \frac{Q}{I\bar{\alpha}} \quad (16)$$

Consider the slope of the curves defined by Eq. 16 at a given acceleration, $\alpha$, of interest, say $\alpha=\alpha^*$. In a given control mode, $\bar{Q}$ is a function of translational velocity and has the form $\bar{Q}=Q^*[v/v^*]$ where $\bar{Q}=\bar{Q}^*$ when $v=v^*$. At $\alpha^*$:

$$\frac{d\bar{\alpha}}{ds} = k\left[\frac{v}{v^*}\right] \quad (17)$$

where $$k = \frac{\bar{Q}}{I\bar{\alpha}}$$

By choosing the switching line to have the form of Eq. 17, we can retain the same angle between the switching line and the path line at all vehicle speeds. Accordingly, the vehicle speed estimate will be used to vary the slope of the switching lines.

A preferred type of phase plane sector layout utilizes four sectors as seen in FIG. 4. The fourth sector is an additional Hold region 402 added between the Apply and Release regions 403 and 401 respectively, by adding a boundary line 431 in the upper right hand quadrant of the plane shown. The purpose of adding the fourth sector is that in the three sector algorithm, a large Release region results in an excessive decrease in brake pressure. Hence, an additional Hold region was interposed between the Release region and the Apply region when moving in a counter-clockwise direction about the phase plane. It is felt this fourth sector will improve stopping distance.

A typical limit cycle path in the phase plane of FIG. 4 is designated 410, and its direction is indicated by arrowheads 401a and 401b. As in the three sector control method, one typically will start into an ABS mode while in the Release region (for example at point 451). The path will then proceed across the zero line of acceleration 420 at point 452 up to sector dividing line 431 at point 453. In the added Hold sector 402 between switching lines 431 and 432, it will be seen that with the four sector approach, the locus of possible paths in this added Hold region 402 is substantially horizontal or parallel to the slip axis of the phase plane. Continuing with the limit cycle of path 410, the path proceeds substantially parallel to the slip axis to dividing line 432 at point 454 whereupon it descends through the Apply region to cross zero acceleration line 420 at point 455, whereupon the stable $\mu$-slip region will cause the path to converge to a line 480 and then to a point 456 located at switching line 433 between the Apply and Hold regions 403 and 404 respectively. At this point, the path will again automatically switch in a saw tooth fashion between the Hold and Apply regions as depicted in region 457 until it intersects a curve parallel to the $\mu$-slip curve at point 458. The path then follows the curve up to its peak at 459 and then to point 461 on switching line 430 separating the Hold and Release regions 404 and 401, respectively. At this point, due to overshoot, the path will descend to point 462 whereupon a new limit cycle will be initiated at path 470.

As with the three-sector control method, the four-sector approach may also have adaptive control wherein different slopes for the sector dividing lines will be chosen as a function of the vehicle speed.

Figure 5A:
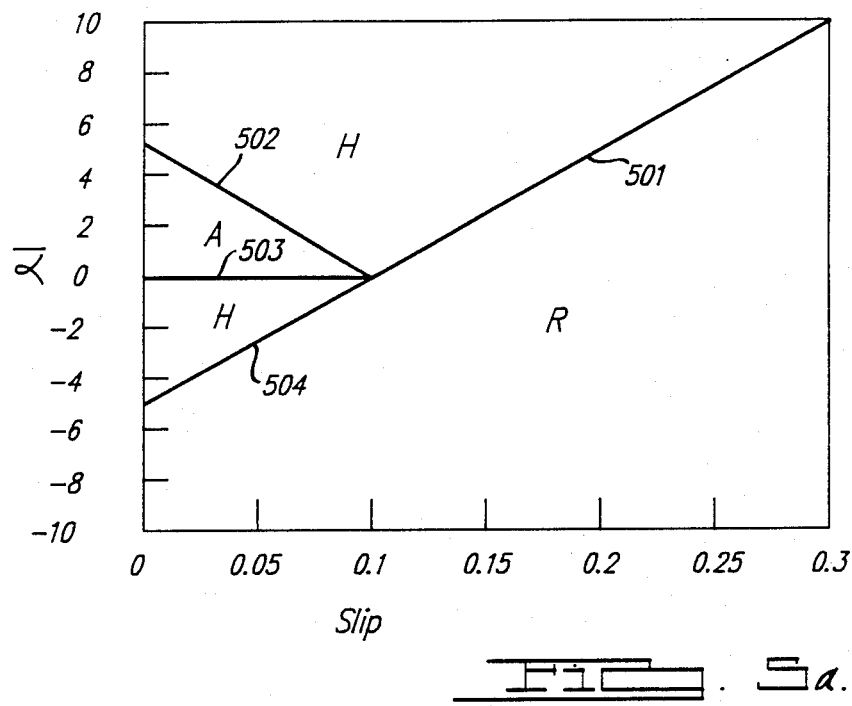
FIGS. 5a and 5b set forth comparative sector boundary line slopes, with FIG. 5a showing typical slopes at a lower speed and FIG. 5b showing typical sector dividing line slopes at a higher speed.
Figure 5B:
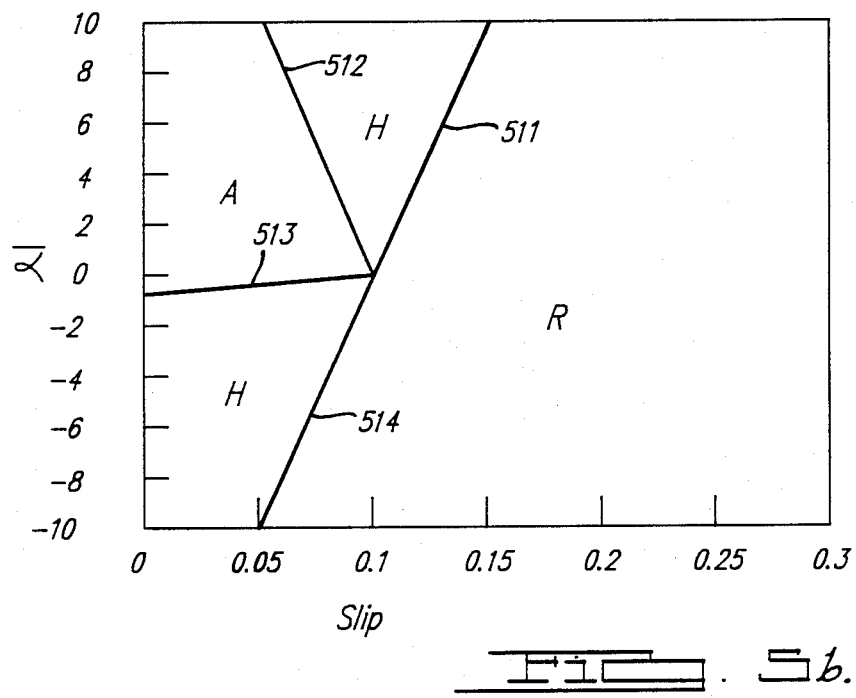
Figure 8:
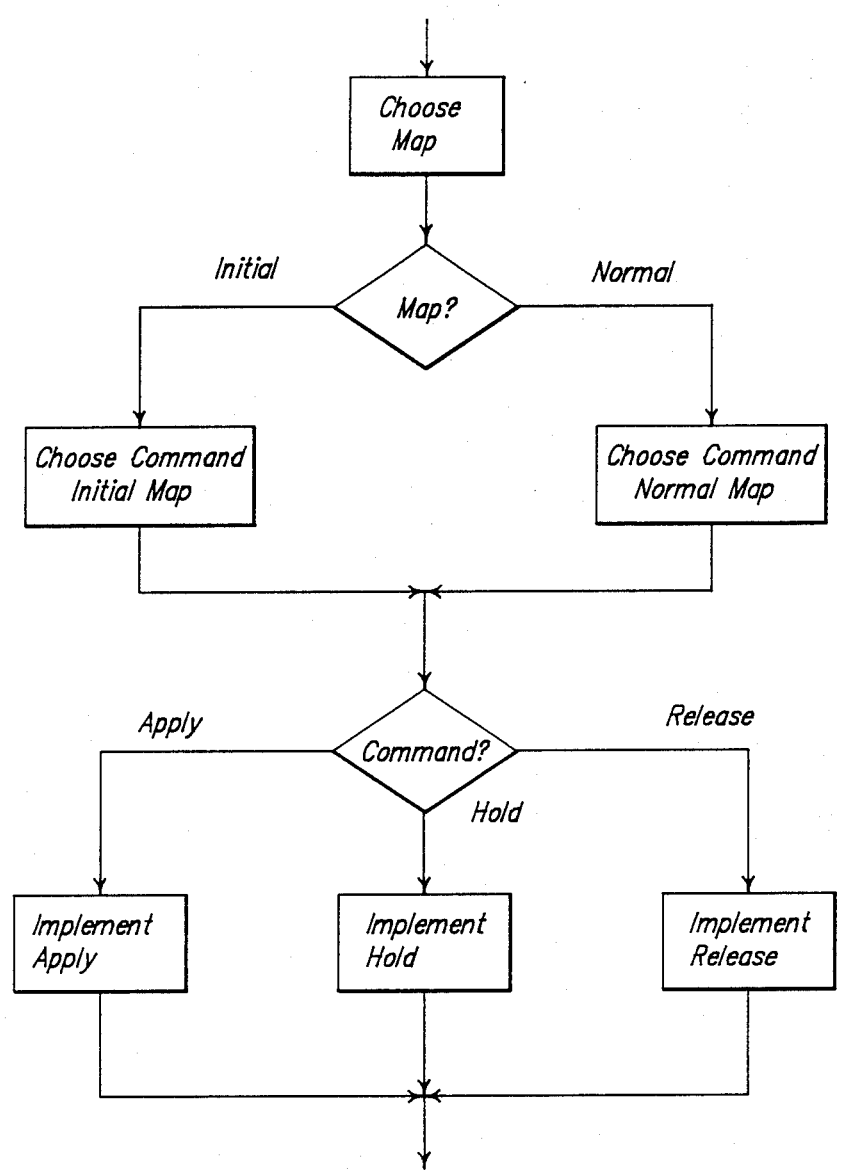

One set of comparisons of sector switching or dividing line slopes as a function of speed is set forth in the representative phase planes of FIGS. 5A and 5B. As seen from FIG. 5A, the slopes of the sector dividing lines are lower than those set forth in FIG. 5B. Hence, the phase plane for FIG. 5A would be used at lower speeds, for example on the order of six miles per hour, while the phase plane sections of FIG. 5B would be used at relatively higher vehicle speeds, for example on the order of 24 miles per hour. Hence a family of phase planes, one for each desired range of vehicle speeds could be advantageously employed in a control method adapted to vehicle speed.

FIG. 6 depicts, in flow chart form, the overall control method block diagram. Given estimates of wheel slip, wheel angular speed, and wheel angular acceleration for a particular wheel, (using known elements such as variable reluctance transducers) the control algorithm chooses which command to send to the hydraulic subsystem: Apply, Hold or Release.

Two types of phase plane maps are available, an initial map and a normal or anti-skid map. The first step as set forth in FIG. 6 is to select which type of map to use. This decision is based on the following sequential logic:

(1) If the last command was Release, use the normal or anti-skid phase plane map;

(2) If the time continuously in the Apply command mode exceeds a predetermined limit, use the initial map;

(3) If the extrapolated reference speed of the vehicle (i.e., extrapolated from the wheel speed at low slip) is below a pre-selected limit, use the initial map;

(4) If none of the above conditions are satisfied, use the map used during the last limit cycle.

The initial map is the map of brake commands used in typical driving and used in the initial phase of entering an anti-skid mode. For conditions of low-slip and low wheel acceleration, the ABS capability does not come into play. When limits of slip and wheel acceleration are exceeded, a release of brake pressure is begun and the system begins ABS cycling.

The normal of anti-skid phase plane map is divided into sectors, preferably into four sectors, and the command selected depends upon which sector holds the current estimate of slip and wheel acceleration.

The invention has been described with reference to embodiments set forth solely for sake of example. The invention is to be interpreted in scope and spirit in accordance with the appended claims.

What is claimed is:

1. In an anti-skid braking system for controlling brake torque on a vehicular wheel, a method for determining a desired one of a plurality of available brake control actions comprising:
   partitioning a phase plane having coordinates defined by wheel slip and wheel acceleration into a plurality of sectors each meeting at a common point in the phase plane, each sector representing one of the plurality of desired brake control actions;
   estimating slip and acceleration of the wheel;
   examining the phase plane at a coordinate point defined by the estimated wheel slip and acceleration and determining the sector containing the point; and
   issuing a command designating one of the plurality of brake control actions in accordance with the determined sector.

2. The method of claim 1 wherein the sectors in the phase plane are defined by linear boundaries.

3. The method of claim 2 further comprising:
   estimating a vehicle reference speed for a vehicle coupled to the wheel, and determining a scope of each of the linear sector boundaries in accordance with the estimated speed.

4. The method of claim 3 wherein the slope of the sector boundaries increases with increasing vehicle reference speed.

5. The method of claim 1 wherein the plurality of brake control actions comprises an APPLY command whereunder brake torque is increased, a RELEASE command whereunder brake torque is decreased and a HOLD command whereunder brake torque is held constant.

6. The method of claim 5 wherein the plurality of sectors comprises at least three, each of the at least three corresponding to one of the APPLY, HOLD, and RELEASE commands.

7. The method of claim 5 wherein the plurality of sectors comprises four sectors, with the first sector representing a RELEASE command; the second sector having a first boundary in common with a first boundary of the first sector and representing a HOLD command; the third sector having a first boundary in common with a second boundary of the second sector and representing the APPLY command; and the fourth sector having a first boundary in common with a second boundary of the third sector and a second boundary in common with a second boundary of the first sector and representing the HOLD command.

8. In an anti-skid braking system for controlling brake torque on a vehicular wheel, an adaptive control method for determining a desired one of at least three available brake control actions, the method comprising:
   partitioning each one of a plurality of phase planes into at least three sectors, each meeting at a common point, each phase plane having coordinates defined by wheel slip and wheel acceleration, with the shape of the sectors being related to a vehicular speed range associated with each phase plane, each sector representing one of the at least three brake control actions;
   estimating a vehicular speed;
   selecting one of the plurality of phase planes in accordance with the estimated vehicular speed;
   estimating wheel acceleration and slip;
   examining the selected phase plane at a coordinate point defined by the estimated wheel slip and acceleration and determining the sector containing the point; and
   issuing a command designating one of the at least three brake control actions in accordance with the determined sector.

9. The method of claim 8 wherein the sectors are defined by linear boundaries.

10. The method of claim 9 wherein a slope of the sector boundaries increases with increasing vehicle reference speed.

11. The method of claim 8 wherein the available brake control actions comprise an APPLY command whereunder brake torque is increased, a RELEASE command whereunder brake torque is decreased and a HOLD command whereunder brake torque is held constant.

12. The method of claim 11 wherein the phase planes are partitioned into four sectors, with the first sector representing a RELEASE command; the sector having a first boundary in common with the first boundary of the first sector and representing a HOLD command; the third sector having a first boundary in common with a second boundary of the second sector and representing the APPLY command; and the fourth sector having a first boundary in common with a second boundary of the third sector and a second boundary in common with a second boundary of the first sector and representing the HOLD command.

13. In an anti-skid braking system for controlling brake torque on a vehicular wheel, a method of determining a desired one of three available brake control actions, the available actions comprising an APPLY command whereunder brake torque is increased, a RELEASE command whereunder brake torque is decreased and a HOLD command whereunder brake torque is held constant, the method comprising:

(a) defining an initial condition phase plane plotting wheel slip versus wheel acceleration and partitioning the initial condition phase plane into a plurality of sectors, each representing one of the three commands;

(b) defining an anti-skid phase plane plotting wheel slip versus acceleration and partitioning the anti-skid phase plane into at least three sectors, each meeting at a common point and each representing one of the three commands;

(c) estimating the speed of a vehicle coupled to the wheel and the wheel slip and wheel accelerations;

(d) comparing the estimated speed to a reference speed;

(e) proceeding to step (k), if the estimated speed is greater than the reference speed;

(f) proceeding to step (i), if the APPLY command has been in effect longer than a predetermined reference;

(g) proceeding to step (k), if the previous command was RELEASE;

(h) proceeding to step (k), if the phase plane last used was the anti-skid phase plane;

(i) examining the initial condition phase plane at a coordinate point defined by the estimated wheel slip and acceleration, determining the sector containing the point and issuing a command in accordance with the determined sector;

(j) returning to step (c);

(k) examining the anti-skid phase plane at a coordinate point defined by the estimated wheel slip and acceleration, determining the sector containing the point and issuing a command in accordance with the determined sector; and (l) returning to step (c).

14. The method of claim 13 wherein the anti-skid phase plane sectors are defined by linear boundaries.

15. The method of claim 14 wherein a slope of the linear boundaries increases as vehicle speed increases.

16. The method of claim 13 wherein the four sectors of the anti-skid phase plane comprise a first sector representing a RELEASE command; the second sector having a first boundary in common with a first boundary of the first sector and representing a HOLD command; the third sector having a first boundary in common with the second boundary of the second sector and representing the APPLY command; and the fourth sector having a first boundary in common with the second boundary of the third sector and a second boundary in common with a second boundary of the first sector and representing the HOLD command.

17. The method of claim 16 wherein the third (APPLY) sector of the anti-skid phase plane includes a stable region focusing most elements of the set of possible paths traversing the phase plane to a predetermined point on the common boundary between the third and fourth (HOLD) sectors.

18. The method of claim 17 wherein the slopes of possible paths succeeding the predetermined point are such that the control method will yield alternating HOLD-APPLY commands as the possible paths are traversed in the vicinity of the common boundary between the third and fourth sectors.

* * * * *